(12) United States Patent
Graves et al.

(10) Patent No.: US 7,469,693 B2
(45) Date of Patent: Dec. 30, 2008

(54) ADVANCED ENGINE MANAGEMENT OF INDIVIDUAL CYLINDERS FOR CONTROL OF EXHAUST SPECIES

(75) Inventors: Ronald L. Graves, Knoxville, TN (US);
Brian H. West, Knoxville, TN (US);
Shean P. Huff, Knoxville, TN (US);
James E. Parks, II, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 11/691,539

(22) Filed: Mar. 27, 2007

(65) Prior Publication Data
US 2007/0227518 A1 Oct. 4, 2007

Related U.S. Application Data

(60) Provisional application No. 60/743,957, filed on Mar. 30, 2006.

(51) Int. Cl.
*F02D 41/04* (2006.01)
*G06F 17/00* (2006.01)

(52) U.S. Cl. .................. 123/673; 123/679; 701/109

(58) Field of Classification Search ......... 701/103–106, 701/109–110; 123/295, 443, 691, 692, 673, 123/679, 1 A, 575, 492, 493, 494
See application file for complete search history.

(56) References Cited

U.S. PATENT DOCUMENTS

| | | | |
|---|---|---|---|
| 6,263,668 B1 * | 7/2001 | Yamashita et al. ............ 60/301 |
| 6,289,877 B1 * | 9/2001 | Weisbrod et al. ............ 123/480 |
| 6,292,739 B1 * | 9/2001 | Yasui et al. .................. 701/109 |
| 6,550,465 B2 * | 4/2003 | Ueno et al. .................. 123/679 |
| 6,604,504 B2 | 8/2003 | Surnilla et al. |
| 6,978,204 B2 * | 12/2005 | Surnilla et al. ............... 701/103 |
| 7,027,906 B2 * | 4/2006 | Araki .......................... 701/104 |
| 7,239,954 B2 * | 7/2007 | Huang ......................... 701/103 |

OTHER PUBLICATIONS

J. P. Breen, et al., "An investigation of the thermal stability and sulphur tolerance of Ag/gamma-Al2O3 catalysts for the SCR of NOx with hydrocarbons and hydrogen", Applied Catalysis B-Environmental, 2007, pp. 36-44, vol. 70 (1-4.

(Continued)

*Primary Examiner*—Willis R. Wolfe, Jr.
*Assistant Examiner*—Johnny H. Hoang
(74) *Attorney, Agent, or Firm*—Luedeka, Neely & Graham, P.C.

(57) ABSTRACT

A method and system controls engine-out exhaust species of a combustion engine having a plurality of cylinders. The method typically includes various combinations of steps such as controlling combustion parameters in individual cylinders, grouping the individual cylinders into a lean set and a rich set of one or more cylinders, combusting the lean set in a lean combustion parameter condition having a lean air:fuel equivalence ratio, combusting the rich set in a rich combustion parameter condition having a rich air:fuel equivalence ratio, and adjusting the lean set and the rich set of one or more cylinders to generate net-lean combustion. The exhaust species may have elevated concentrations of hydrogen and oxygen.

18 Claims, 10 Drawing Sheets

OTHER PUBLICATIONS

R. Burch and M. D. Coleman, "An investigation of promoter effects in the reduction of NO by H-2 under lean-burn conditions", Journal of Catalysis, 2002, pp. 435-447, vol. 208 (2).

L. Fu and K. T. Chuang, "Control of NOx Emissions by Selective Catalytic Reduction with Hydrogen over Hydrophobic Catalysts", Energy & Fuels, 1989, pp. 740-743, vol. 3.

* cited by examiner

ADVANCED ENGINE MANAGEMENT OF INDIVIDUAL CYLINDERS FOR CONTROL OF EXHAUST SPECIES

CROSS-REFERENCE TO RELATED APPLICATIONS

This application claims priority to U.S. Provisional Patent Applications 60/743,957 filed Mar. 30, 2006, herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

The highly effective three-way catalyst in widespread use in many modern vehicles with spark ignition engines simultaneously reduces nitrogen oxides ($NO_x$) while also oxidizing carbon monoxide (CO) and hydrocarbons (HC). This catalyst function is enabled by tight control of exhaust air:fuel ratio (AFR).

Air:fuel equivalence ratio is determined by dividing the stoichiometric AFR by the actual AFR. Stoichiometry is defined as the chemically-correct AFR for complete theoretical combustion of all fuel with no remaining oxygen. As such, equivalence ratios greater than 1 always represent excess fuel conditions (rich) in the fuel-oxidizer mixture than stoichiometry, irrespective of the fuel and oxidizer being used. Equivalence ratios less than 1 represent an excess oxidizer condition (lean condition) in which complete theoretical combustion of all fuel leaves remaining oxygen in the combustion products. Net-lean combustion is defined as an exhaust condition in which the combination of rich and lean combustion results in common rich exhaust species (hydrogen, carbon monoxide, hydrocarbons) in the presence of more oxygen than what would be required for complete combustion (stoichiometric reaction). Enriched combustion occurs when the air:fuel equivalence ratio is raised via increasing the amount of fuel delivered to a cylinder by pre-existing injections or through the use of one or more additional injections.

Dithering the AFR slightly lean and slightly rich of stoichiometric operation allows the simultaneous control of $NO_x$, CO, and HC in the conventional three-way catalyst. The excess oxygen present in lean diesel engine exhaust precludes the use of the three-way catalyst. The Lean $NO_x$ trap (LNT, also $NO_x$ adsorber or $NO_x$ Storage and Reduction (NSR) catalyst) is receiving considerable attention as a possible means to enable light- and heavy-duty diesel engines to meet future emissions standards. The LNT functions by storing $NO_x$ during normal lean operation (when excess oxygen in the exhaust hinders the chemical reduction of $NO_x$). The LNT must be regenerated periodically by a rich excursion, a brief event in which the exhaust AFR is driven rich to achieve overall reducing conditions. The excess-fuel derived reductants (HCs, CO, hydrogen ($H_2$)) cause the release and subsequent reduction of the stored $NO_x$.

Several approaches to achieving this momentary rich excursion are being researched. In some cases raw fuel is sprayed into the exhaust ("in-pipe injection") to enable regeneration. Synthesis gas has been shown to be a very effective reductant in both bench and full-scale laboratory experiments. As such, on-board fuel reformers are being researched as a potential means to provide CO and $H_2$ for catalyst regeneration. In addition, in-cylinder injection of excess fuel, or rich combustion, is a common method, as well as the individual cylinder control method taught in this invention. All of these methods have unique advantages and disadvantages and are being considered as strategies for various diesel vehicle applications either individually or as coupled technologies.

BRIEF DESCRIPTION OF THE INVENTION

Hydrogen ($H_2$) is an excellent reductant, and has been shown to be highly effective when introduced into a variety of catalysts such as three-way catalysts, lean $NO_x$ traps (LNTs), and hydrocarbon lean $NO_x$ catalysts (also termed hydrocarbon selective catalytic reduction (SCR) catalysts). Furthermore, since lean-burn engines offer improved fuel efficiency yet difficult $NO_x$ emission control, $H_2$ production during lean operation for the purpose of $NO_x$ reduction could be beneficial. On-board generation of hydrogen is being explored via catalytic or plasma-based reformers. A possible alternative to these add-on systems is generation of the $H_2$ in-cylinder with standard fuel injection hardware. This invention relates to the production and measurement of $H_2$ and other light reductant species such as CO, propene, and other hydrocarbons under net-lean operation in a common-rail diesel engine. Individual in-cylinder fuel control is used to tailor the combustion process such that the light reductants are generated while maintaining a net lean air:fuel equivalence ratio in the bulk exhaust gas.

This invention is a method and system for controlling engine-out exhaust species of a combustion engine having a plurality of cylinders by providing a means for controlling combustion parameters in individual cylinders, grouping the individual cylinders into a lean set and a rich set of one or more cylinders, combusting the lean set in a lean combustion parameter condition having a lean air:fuel equivalence ratio, combusting the rich set in a rich combustion parameter condition having a rich air:fuel equivalence ratio, and providing a means for adjusting the lean set and the rich set of one or more cylinders to generate net-lean combustion. The exhaust species comprise elevated concentrations of hydrogen and oxygen.

DETAILED DESCRIPTION OF THE INVENTION

Figure 1:
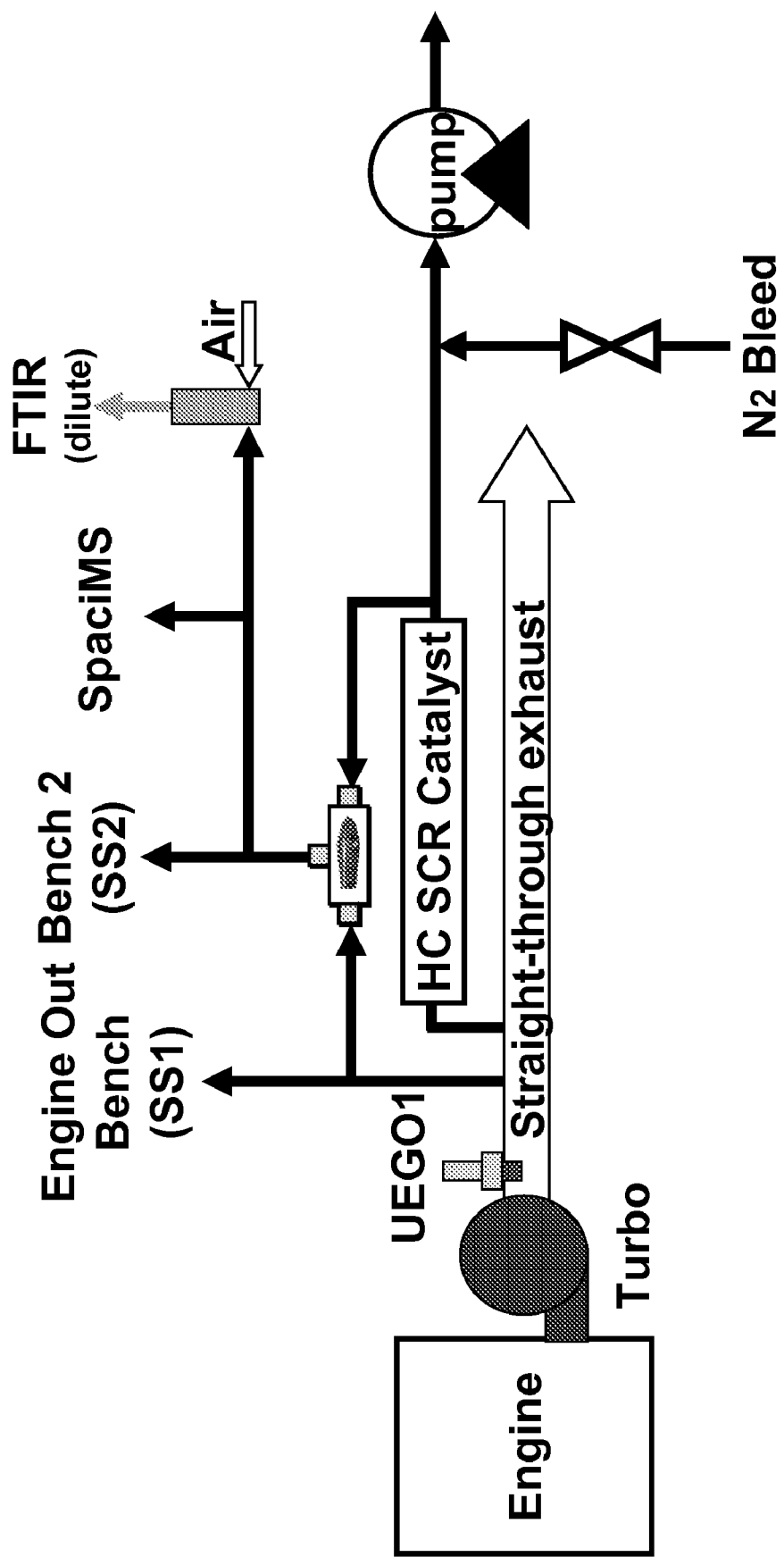
FIG. 1 is the exhaust sampling schematic.

Exhaust species generated by in-cylinder injection of excess fuel was characterized in support of this invention. By combining combustion parameters such as intake throttling, exhaust gas recirculation (EGR) control, and manipulation of the timing and duration of in-cylinder fuel injection events, the exhaust can be driven into the rich regime required for Lean $NO_x$ Traps (LNT) regeneration. These results were published in proceedings from the *Society of Automotive Engineers* (SAE) publication 2004-01-3023, entitled; "Assessing Reductant Chemistry During In-Cylinder Regeneration of Diesel Lean $NO_x$ Traps", herein incorporated by reference Regeneration of LNTs is accomplished by several means. Spark ignition engines can readily be run rich to create reductant species such as carbon monoxide (CO), hydrogen ($H_2$), and hydrocarbons (HC) for LNT regeneration. To regenerate LNTs on diesel engines, many approaches are being explored. One approach is to spray diesel fuel into the exhaust for regeneration. Synthesis gas has been shown to be an effective reductant, and as such, fuel reformers are being explored as a means to produce the reductant species for regeneration. In-cylinder approaches to LNT regeneration are also being researched.

Another reported application of reformate is to enhance HC SCR catalyst function. Researchers have shown reformate, or more specifically $H_2$, to significantly improve NO conversion over $Ag/Al_2O_3$ catalysts across a wide temperature range. Additionally, $H_2$ has been shown to offset performance losses of HC SCR catalysts associated with increased space velocity and sulfur presence. The presence of $H_2$ in lean exhaust can also serve to accelerate catalyst lightoff.

Hydrogen improves the $NO_x$ reduction of a catalyst under lean conditions as reported in the following publications herein incorporated by reference: 1) L. Fu and K. T. Chuang, "Control of $NO_x$ Emissions by Selective Catalytic Reduction with Hydrogen over Hydrophobic Catalysts", *Energy & Fuels*, Vol. 3, pp. 740-743 (1989); 2) R. Burch and M. D. Coleman, "An investigation of promoter effects in the reduction of NO by H-2 under lean-burn conditions", *Journal of Catalysis*, Vol. 208 (2), pp. 435-447 (2002); 3) J. P. Breen, R. Burch, C. Hardacre, C. J. Hill, B. Krutzsch, B. Bandl-Konrad, E. Jobson, L. Cider, P. G. Blakeman, L. J. Peace, M. V. Twigg, M. Preis, and M. Gottschling, "An investigation of the thermal stability and sulphur tolerance of $Ag/gamma-Al_2O_3$ catalysts for the SCR of NOx with hydrocarbons and hydrogen", *Applied Catalysis B-Environmental*, Vol. 70 (1-4), pp. 36-44 (2007).

A Mercedes OM668 1.7 liter common-rail diesel engine is coupled to a motoring DC dynamometer. The engine is a 1999 model used in the Mercedes A170 in Europe. Modifications to the engine include the addition of an electronic intake throttle, an electronically controlled EGR valve (in lieu of the stock vacuum-operated valve), and an EGR cooler. Additionally, the factory engine control module was replaced with a rapid development engine controller based on a dSpace® MicroAutoBox. This rapid development system (RDS) provides complete control over all engine electronics and combustion parameters including timing, duration, and number of fuel injection events, intake throttle, EGR valve, and turbocharger wastegate.

Dual conventional emissions benches are used for raw exhaust sampling. Benches use California Analytical Instruments® non-dispersive infrared (NDIR) analyzers for CO and carbon dioxide ($CO_2$), heated chemiluminescent detectors (HCLD) for $NO_x$, and heated flame ionization detectors (HFID) for total hydrocarbons. This engine and associated hardware have been used largely for Lean $NO_x$ Trap research in which full-size (2.5 liter) LNT catalysts are exposed to 100% of the exhaust flow. For the experiments described herein, there were no full size catalysts installed on the engine exhaust system. Slipstream exhaust samples were extracted for exhaust characterization, as well as for a preliminary HC SCR experiment. The small catalyst core was exposed to a slipstream of the total exhaust flow, as shown in FIG. 1.

A Nicolet Rega 7000 Fourier Transform InfraRed (FTIR) analyzer is used for quantifying several species, including ammonia ($NH_3$), nitrous oxide ($N_2O$), light hydrocarbons (e.g., methane, ethene, ethyne, propene, 1,3 butadiene, isobutylene), and formaldehyde and acetaldehyde in diluted exhaust. A magnetic sector mass spectrometer was used for measuring $H_2$ in the exhaust; a capillary was used to transfer the exhaust sample to the vacuum of the mass spectrometer for analysis.

FIG. 1 schematically shows the relative location of the engine, catalyst core sample, sample locations and sensors. For most of the measurements described, only engine-out exhaust was characterized. A preliminary experiment to investigate the potential of this lean, hydrogen-containing exhaust was conducted by pulling a slipstream of exhaust through a small precious metal catalyst. After measuring the engine out exhaust with the conventional emissions benches, SpaciMS, and FTIR, these samples were drawn from the catalyst outlet location concurrent with an additional sample pump thereby inducing flow through the catalyst core. The total flow through the core sample was some 43 liters/minute, for a resultant space velocity of 30,000/hr.

This experimental setup has been used in LNT studies, and as such, strategies for intermittent rich operation have been developed and characterized. These strategies combine full control over the electronic intake throttle, exhaust gas recirculation, as well as the timing, duration, and number of fuel injection events. The LNT regenerations studied thus far typically combine a ramping down of the throttle to some minimum setting that is held for 7 seconds. In the midst of this minimum throttle setting, additional fuel is added by increasing the main injection pulse width or by the addition of a late cycle post injection. These fuel injection modifications are in effect for 3 seconds and achieve rich operation and consequently LNT regeneration. The engine is then typically returned to a "normal lean" operating condition during which the LNT again begins storing $NO_x$. This lean period is typically 30-60 seconds. For a given set of conditions, the mass of the fuel addition (pulse width) dictates the degree of richness or the minimum air:fuel equivalence ratio (AFR).

Figure 2:
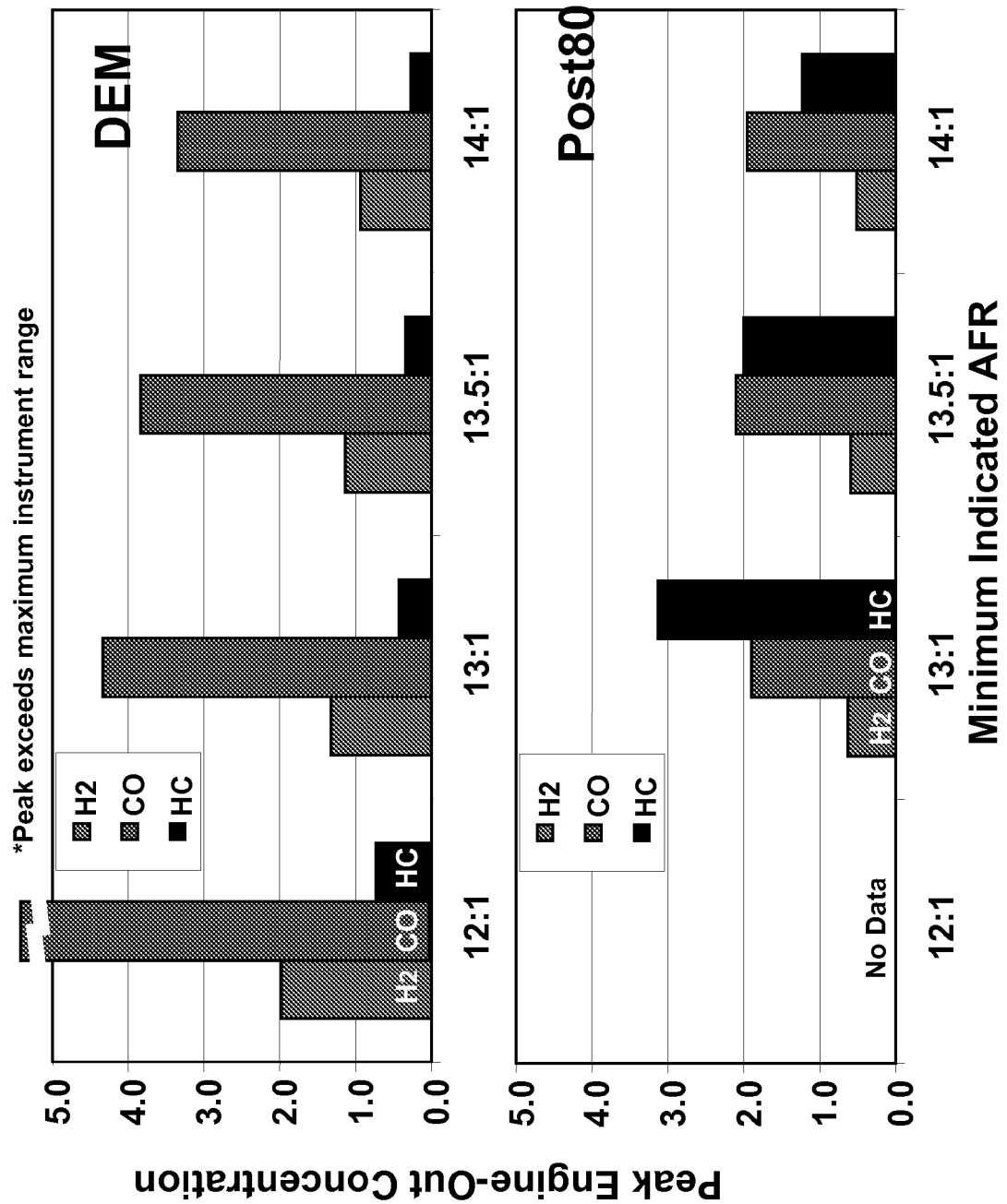
FIG. 2 is bar charts showing engine-out $H_2$, CO, and HC for AFR sweep, DEM, and Post80 LNT regeneration strategies.

Post80 Injection with Enriched Combustion: During fueling sweeps in which minimum AFR was varied, it was noted that for a late post injection (800 after top dead center (ATDC), or Post80) that the $H_2$ and CO production were not affected by the amount of excess fuel (i.e., AFR) in the rich regime. For the Post80, leaner overall AFR lowered peak hydrocarbon (HC) emissions, but $H_2$ and CO peaks were relatively flat across the sweep, while for a delayed and extended main (DEM) strategy, all three species were decreased as AFR increased. These results are shown in FIG. 2.

Figure 3:
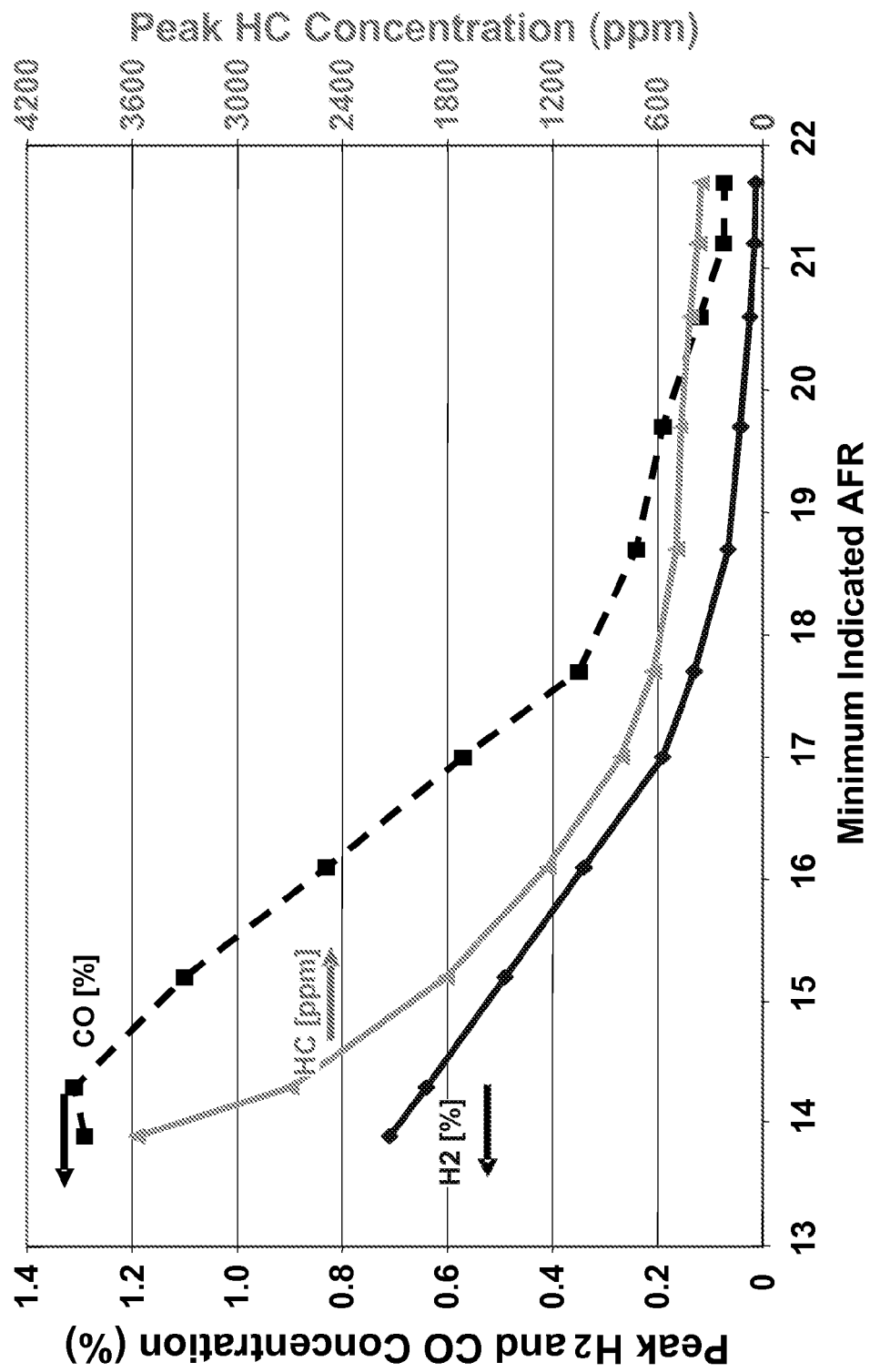
FIG. 3 is a graph of peak hydrogen, CO, and HC concentrations for Post80 AFR sweep of 3 second duration.

The observation with Post80 described above led to extending the AFR sweep to leaner conditions, to examine whether the $H_2$ production trend could be extended into the lean regime. Results of this experiment are shown in FIG. 3. The data show that for a short (3 second) fueling pulse, elevated concentrations of hydrogen can be produced even at lean indicated AFR. Peak $H_2$ concentration during these "regenerations" drops from a peak of 0.7% near 14:1 to about 0.1% at 18:1 AFR. The objective of this experiment was to assess the $H_2$ production for an extension of a well-characterized LNT regeneration strategy. A similar experiment was conducted using the DEM strategy, and as expected, much lower levels of $H_2$ were detected at AFR leaner than stoichiometry.

Individual-Cylinder DEM with Enriched Combustion: The Delayed and Extended Main (DEM) LNT regeneration strategy produces more $H_2$ and CO and less HC than Post80, but as the strategy is leaned out, $H_2$ production drops to zero. The concept of individual cylinder control to generate reformate in net-lean conditions was developed to overcome this limitation. The strategy commands 1 cylinder rich, while the other 3 cylinders remain lean. To preclude engine imbalance and perhaps premature engine wear, each cylinder is programmed to run rich for only 400 milliseconds (ms), although this parameter is readily adjustable from approximately 100 to 1000 ms. For example, cylinder 1 runs rich for 400 ms while cylinders 2-4 run lean. When cylinder 1 transitions back to lean operation, cylinder 3 (the next cylinder in firing order) transitions into the rich regime. For the data shown in FIG. 3, and in routine LNT regenerations, the throttle is ramped down to some minimum, excess fuel is injected, then the throttle is returned to full open during lean operation. For the individual-cylinder DEM experiments, the throttle was fixed at 20% open while individual cylinders were cycled through rich operation for 400 ms at a time. For the engine condition studied (nominally 1500 RPM, 50 ft lb torque), using this throttle strategy, the nominal AFR drops from about 31 to about 26 (for all 4 cylinders). For this condition, the pilot and main pulse widths are 220 and 600 microseconds ($\mu$s), respectively. An AFR sweep was conducted in which the selected "rich" cylinder was fueled at 1.0, 1.5, 2.0, 2.5, and 3.0 times the normal main injection (600, 900, 1200, 1500, and 1800 $\mu$s, respectively). The strategy includes a means for adjusting the lean set and the rich set of cylinders such that a sequential indexing cycle of the rich set of cylinders insures that individual cylinders run rich approximately the same length of time per complete indexing cycle. A complete indexing cycle is accomplished when all cylinders run rich for a period of time.

Figure 4:
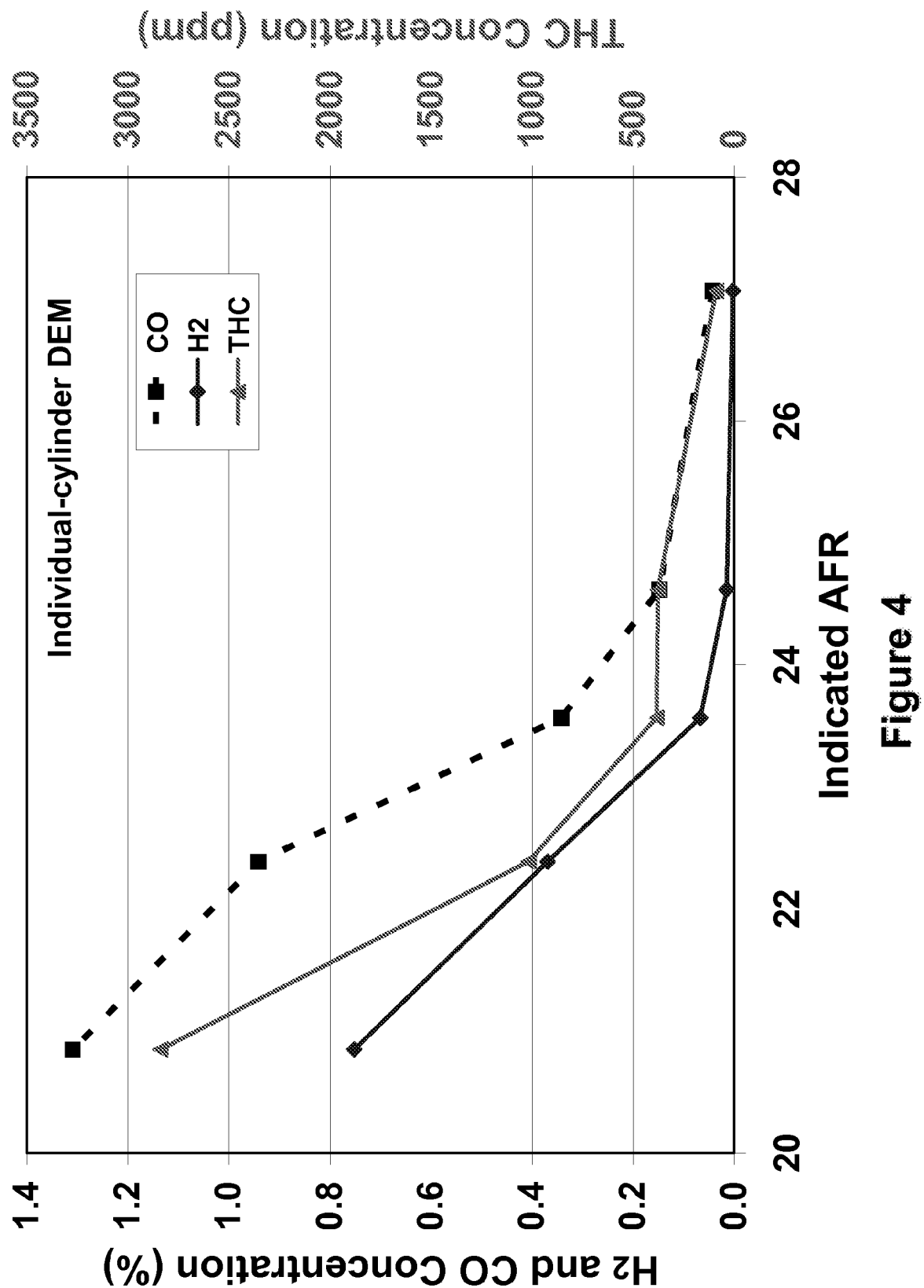
FIG. 4 is a graph of $H_2$, CO, and HC concentrations for continuous individual-cylinder DEM.
Figure 5:
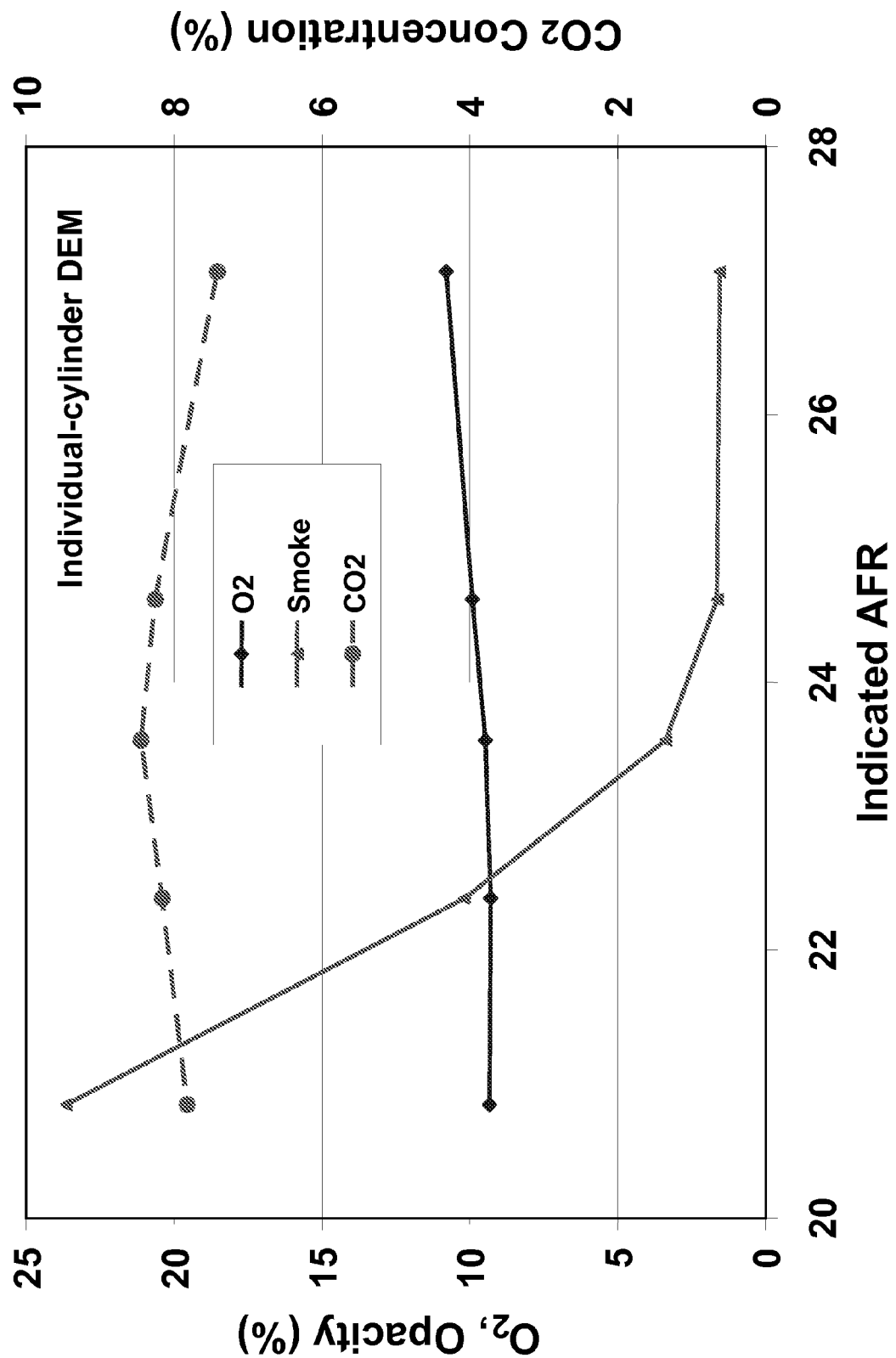
FIG. 5 is a graph of oxygen, opacity (smoke), and $CO_2$ levels for continuous individual-cylinder DEM.

FIG. 4 shows results of the individual cylinder DEM AFR sweep on reductant formation. Continuous rich operation of one cylinder at a time can produce over 0.7 percent $H_2$ with about 1.3% CO, less than 3000 ppm total HC (THC), with over 9% oxygen remaining in the exhaust. FIG. 5 shows the measured oxygen concentration (paramagnetic detector), $CO_2$ (NDIR), and smoke (opacity). Recall that the throttle is fixed at 20% while individual cylinders take turns running rich to achieve the reformate generation under net-lean conditions. The leanest AFR on the x-axis represents normal fueling but with the throttle set to 20%. For the same condition with wide-open throttle, the AFR is 31, and the engine-out oxygen concentration is elevated to about 12%. Diesels normally operate lean (AFR ranges from ~20:1 at full load to over 100:1 at idle). Diesel exhaust emission controls (lean NOx traps) require periodic rich excursions (AFR<14.5:1).

Figure 6:
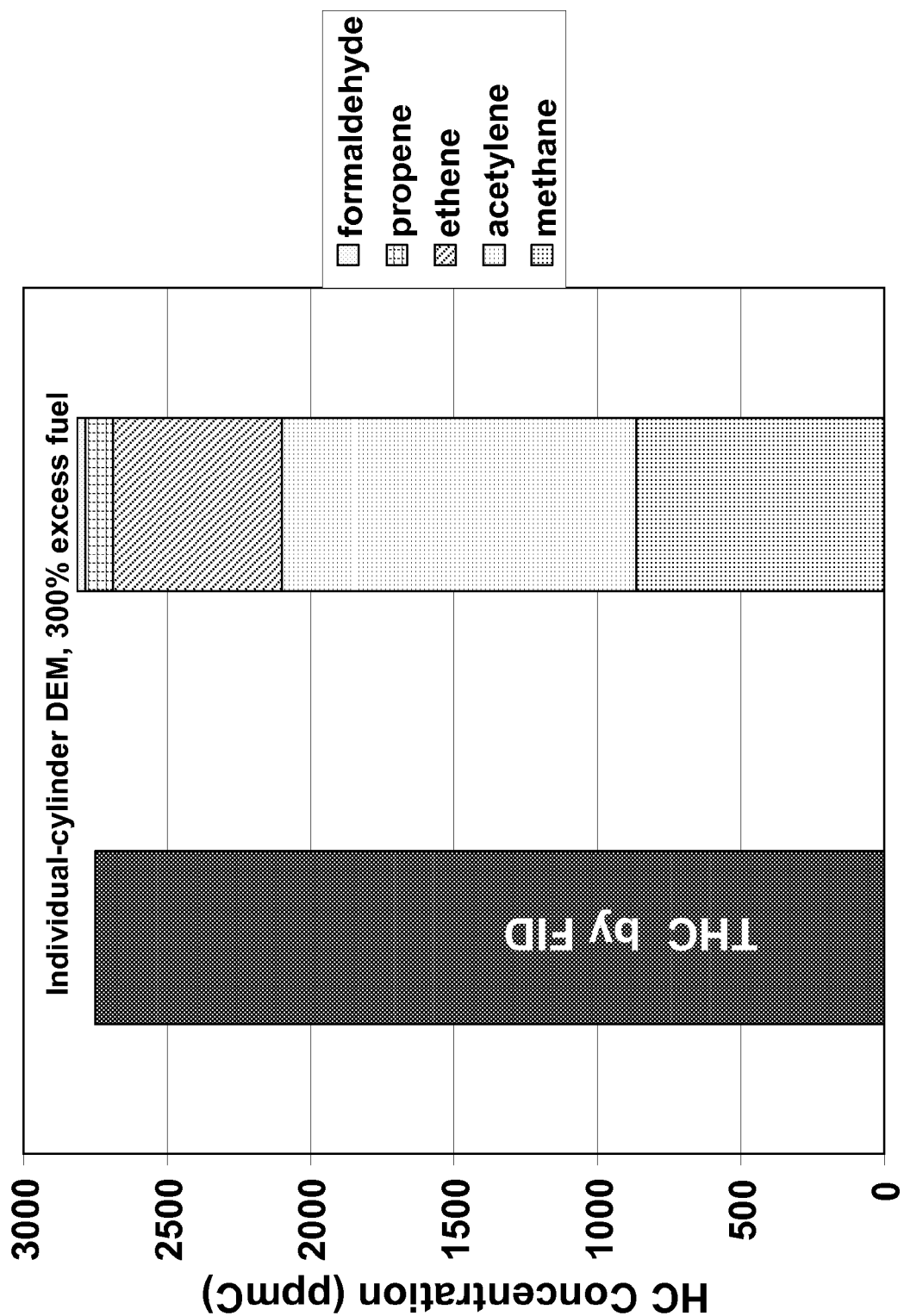
FIG. 6 is a bar chart of engine-out hydrocarbon species for continuous individual-cylinder DEM, 3 times excess fuel fraction.

Examining some of the HC species with FTIR reveals copious amounts of methane for the richest case. FIG. 6 shows that a few light HC species readily quantified by FTIR more than account for the total FID response. With the exception of methane, these species are known to be effective HC SCR reductants.

Omission of Throttle: The normal exhaust condition for the engine load studied is 12% $O_2$ and an indicated AFR of 31. Throttling to 20% has a noticeable effect on brake specific fuel consumption (bsfc), but is useful in reducing the AFR from 31 to 26 prior to adding any excess fuel. Identical experiments were conducted in which the throttle was full open, and the wastegate opened to lower AFR. While absolute concentrations of $H_2$, CO, HC, and $O_2$ varied slightly, the trends for the sweep of AFR were very similar. Smoke and bsfc were also similar.

Effect on Catalyst: Core samples (5.08 cm (2.0 inch) diameter×5.4 cm (2.125 inch) long) were taken from larger catalysts and canned to facilitate space velocity sweeps and to also facilitate cold-start simulation. A preliminary catalyst experiment was conducted with a platinum HC SCR catalyst core. Again, FIG. 1 shows a schematic of the experimental setup. While characterizing the engine-out emissions for the individual cylinder DEM strategy, the pump shown in the sketch was switched off, and a small nitrogen bleed (~5 lpm) was allowed to flow backward through the catalyst into the exhaust stream, to prevent any exhaust flow through the catalyst sample. Sample system 1 (SS1) and sample system 2 (SS2) both sampled from the engine-out location, as did the SpaciMS for $H_2$ measurement, and the micro-dilution tunnel for FTIR. The nitrogen bleed entered the exhaust system well downstream of the engine-out sample locations.

After establishing a steady-state condition at the richest individual cylinder DEM setting, and acquiring the engine-out data, the nitrogen bleed valve was switched off concurrent with switching on the sample pump and changing the sample location of SS2, and the FTIR dilution tunnel, initiating an exhaust flow of some 43 slpm (standard liters per minute), representing a space velocity of 30,000 $hr^{-1}$ for this size catalyst sample. The objective of this experiment is to quantify the potential of such engine strategies in accelerating catalyst lightoff, and to investigate the promotional effect of the reformate produced in-cylinder on the catalyst function. Thermocouples were deployed at the inlet, outlet, and core of the Pt HC SCR sample.

Figure 7:
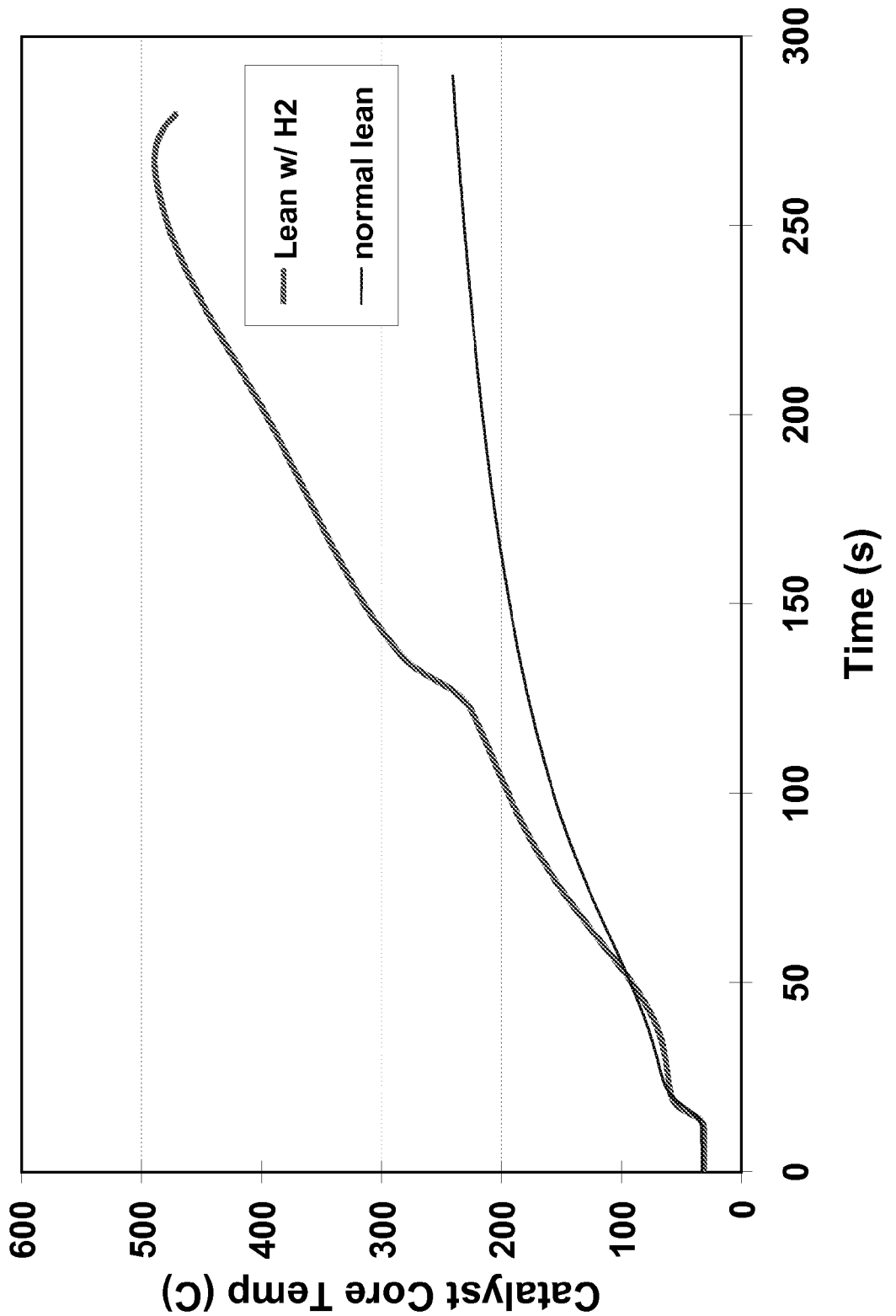
FIG. 7 is a graph of catalyst core temperature versus time for 30 k $hr^{-1}$ space velocity, normal lean versus individual-cylinder DEM (lean with $H_2$)

FIG. 7 shows the effect of the individual cylinder DEM strategy on the core temperature. The flow rates through the catalyst sample were the same in each case, and the exhaust temperature at the turbo-out location for each case was about 280-290° C. Note that both curves show a near step-change in temperature when the pump is started at about 15 seconds. The warmup rates are very similar until the core temperature reaches 100 C, when the augmented warmup begins to take effect. At about 120 seconds the catalyst lights off, its core temperature rapidly jumping about 50° C., then continuing to rise to nearly 500° C. before the augmentation is stopped.

Figure 8:
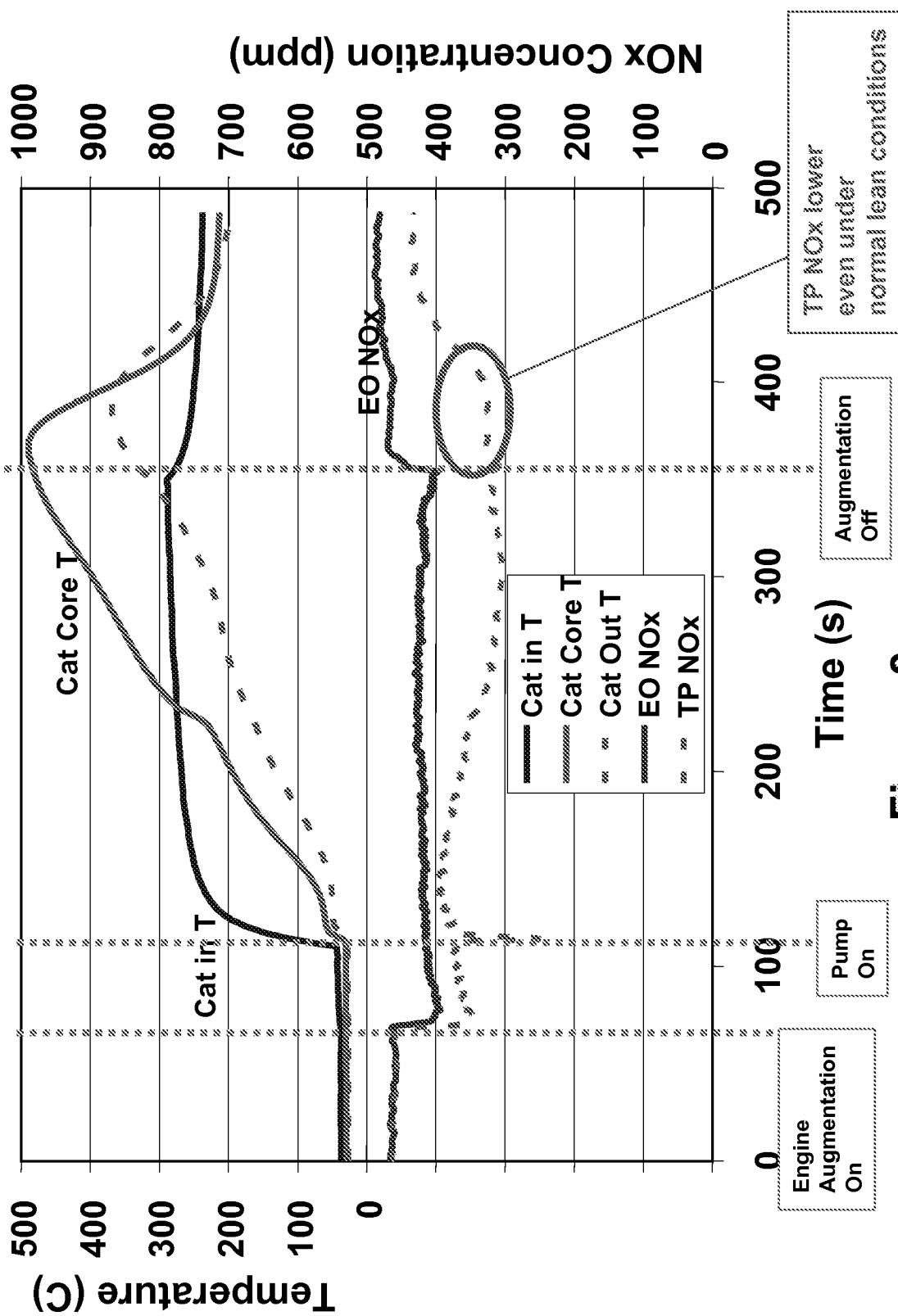
FIG. 8 is a graph of catalyst inlet and outlet $NO_x$ concentration, and catalyst inlet, core, and outlet temperatures for individual-cylinder DEM strategy during a preliminary catalyst warmup experiment.

The augmented warmup is shown again in FIG. 8 (with a different time axis). The figure shows the core temperature again, with catalyst inlet and outlet temperatures as well as engine-out (EO) and tailpipe (TP) $NO_x$ emissions. Note the lightoff at about 240 seconds on this figure. The core temperature exceeds that of the inlet temperature and continues to rise until the reformate production is aborted just before 400 s or 500° C. core temperature. The TP $NO_x$ is more than 100 ppm below the engine-out level during the individual cylinder DEM operation, representing a 25% reduction. Note that the TP $NO_x$ remains at around 320 ppm even after normal lean operation is resumed. Reasons for this result are unclear, although may be related to chemical reduction of the catalyst sites by the $H_2$, and subsequent chemical reduction of the $NO_x$ by the residual HC on the catalyst. This phenomenon will be examined in more detail in future experiments.

Figure 9:
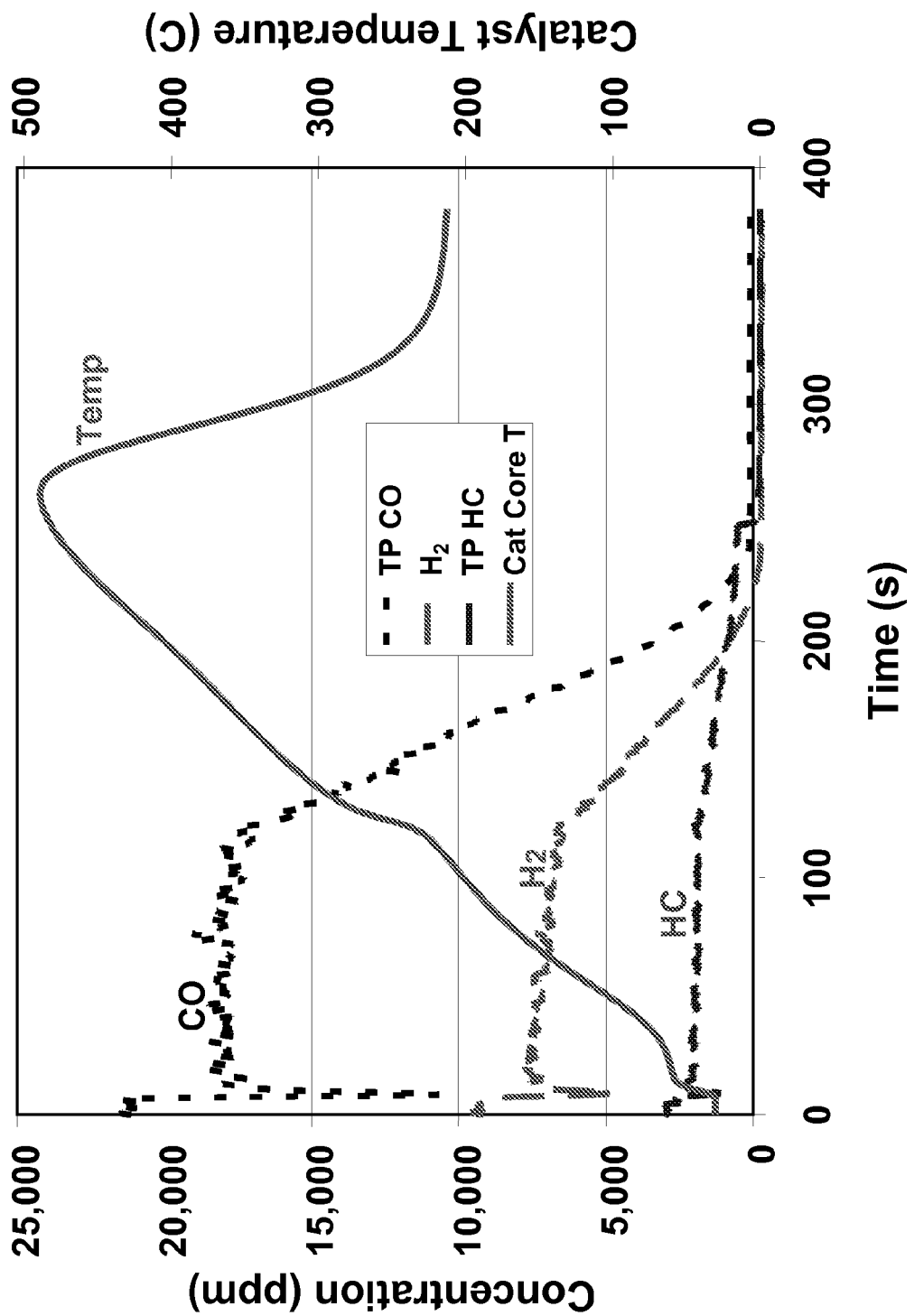
FIG. 9 is a graph of catalyst-out reductant concentrations for individual-cylinder DEM strategy during a preliminary catalyst warmup experiment.

The HC, CO, and $H_2$ data for this experiment are shown in FIG. 9. The inlet HC concentration of 2800 ppm yields a HC:NOx ratio of less than 7 (although there is also CO and $H_2$ reductant availability). As described earlier, the experiment was setup such that SS2 was sampling the engine-out exhaust while the catalyst sample was purged with $N_2$. The engine-out levels of $H_2$, HC, and CO can be seen in FIG. 9 just prior to valve switching (at about 10 s) and the onset of exhaust flow through the catalyst sample. Note the gradual drop in $H_2$ below 200° C., where little or no activity with the HC or CO is noted. After lightoff, all three species concentrations drop rapidly.

Fuel Economy: The fuel economy penalty for the individual DEM strategy peaks at the richest setting (3 times normal main injection) where the brake specific fuel consumption is increased about 40% (from 221 g/kwh to 310 g/kwh) above the baseline condition. While this increase may represent a severe penalty under constant operation, such a strategy may be very helpful for cold start or during cold operation. For example, 30 seconds of operation in this mode would impose a fuel economy penalty of less than 1% on the standard 1372 second LA-4 drive cycle. Thus, periodic infrequent use of such a strategy may offer benefits to advanced aftertreatment systems, including HC SCR, diesel oxidation catalyst (DOC), catalyzed diesel particulate filter (CDPF), and/or LNT.

Figure 10:
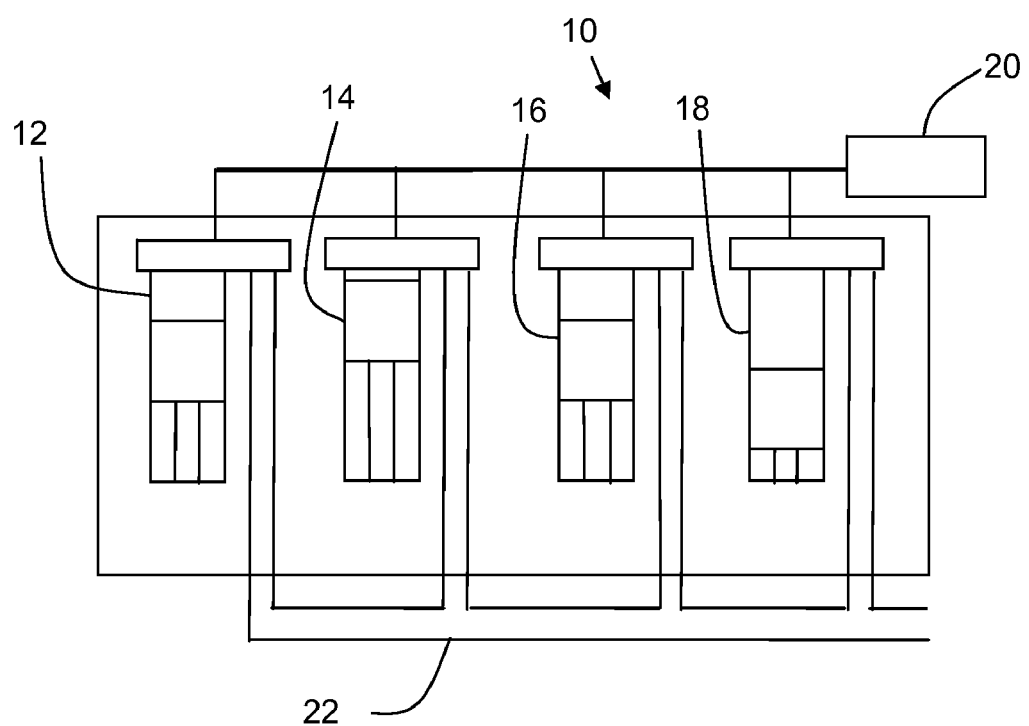
FIG. 10 is a somewhat schematic drawing of a combustion engine.

FIG. 10 depicts a combustion engine 10. The combustion engine 10 has a first cylinder 12, a second cylinder 14, a third cylinder 16 and a further cylinder 18. The first cylinder 12, the second cylinder 14 and the third cylinder 16 are a lean set of cylinders that are configured for combusting in a lean combustion parameter condition, wherein a lean air:fuel equivalence ratio is established. The forth cylinder 18 is a rich set of one or more cylinders (one cylinder in this case) that is configured for combusting in a rich combustion parameter condition, wherein a rich air:fuel equivalence ratio is established. A control system 20 is provided for sequentially indexing the lean set and the rich set of one or more cylinders, and for generating net-lean combustion. An exhaust system 22 extracts the net-lean combustion species from the cylinders 12, 14, 16, and 18.

Strategies previously developed for in-cylinder regeneration of LNTs have been modified to allow production of $H_2$ and other reformate products (e.g., CO, light HCs) under net-lean exhaust conditions. Notable conclusions are the following: 1) Reducing the excess fuel for the normally rich Post80 LNT strategy results in net-lean production of $H_2$, CO, and HC. Moderating the DEM in a similar fashion produces very little $H_2$ and CO in the lean regime; 2) Running 1 of 4 cylinders with a rich DEM strategy can produce a continuous stream of up to 0.8% $H_2$, over 1% CO, and 3000 ppm HC in net-lean exhaust with over 9% $O_2$ remaining; 3) Preliminary catalyst experiments show that the presence of reformate in net-lean diesel exhaust can accelerate catalyst lightoff; 4) Promotion of catalytic $NO_x$ conversion by $H_2$ during net-lean operation has been demonstrated by others.

While there has been shown and described what are at present considered the preferred embodiments of the invention, it will be obvious to those skilled in the art that various changes and modifications can be made therein without departing from the scope.

We claim:

1. A method for controlling engine-out exhaust species of a combustion engine having a plurality of cylinders, the method comprising:

grouping said cylinders into a lean set and a rich set of one or more cylinders, combusting said lean set using a lean combustion parameter condition wherein a lean air:fuel equivalence ratio is established, combusting said rich set using a rich combustion parameter condition wherein a rich air:fuel equivalence ratio is established, wherein a net-lean combustion condition is generated in the exhaust species.

2. The method of claim 1 wherein said net-lean combustion results in an elevated concentration of hydrogen in the exhaust species ranging from about zero percent to about 0.8 percent per cylinder in the rich set.

3. The method of claim 1 wherein said lean and rich combustion parameter conditions include at least one parameter selected from the group consisting of intake throttling, exhaust gas recirculation (LGR), timing of in-cylinder fuel injection, duration of in-cylinder fuel injection, number of fuel injection events, and turbocharger wastegate.

4. The method of claim 1 wherein said rich combustion parameters conditions comprise enriched combustion.

5. The method of claim 1 further comprising a step of controlling the rich and lean combustion parameter conditions using a Delayed and Extended Main strategy.

6. The method of claim 1 further comprising a step of controlling the rich and the lean combustion parameter conditions using a Post80 strategy.

7. A combustion engine having a plurality of cylinders comprising:

a lean set of cylinders configured for combusting in a lean combustion parameter condition wherein a lean air:fuel equivalence ratio is established, a rich set of one or more cylinders configured for combusting in a rich combustion parameter condition wherein a rich air:fuel equivalence ratio is established, and a control system configured for generating a net-lean combustion exhaust condition.

8. The combustion engine of claim 7 wherein said net-lean combustion exhaust condition comprises an elevated concentration of hydrogen ranging from about zero percent to about 0.8 percent per cylinder in the rich set.

9. The system-combustion engine of claim 7 wherein said lean and rich combustion parameter condition includes at least one parameter selected from the group consisting of intake throttling, exhaust gas recirculation (EGR), timing of in-cylinder fuel injection, duration of in-cylinder fuel injection, number of fuel injection events, and turbocharger wastegate.

10. The combustion engine of claim 7 wherein said rich combustion parameter condition comprises enriched combustion.

11. The combustion engine of claim 7 wherein the control system is further configured for controlling the rich and lean combustion parameter conditions using a Delayed and Extended Main strategy.

12. The combustion engine of claim 7 wherein the control system is further configured for controlling the rich and lean combustion parameters conditions using a Post80 strategy.

13. The method of claim 1 further comprising sequentially indexing said lean set and said rich set of one or more cylinders to generate the net-lean combustion condition in the exhaust species.

14. The method of claim 1 wherein said net-lean combustion results in elevated concentrations of carbon monoxide in the exhaust species ranging from about 0.03 percent to about 1.3 percent per cylinder in the rich set.

15. The method of claim 1 wherein said net-lean combustion results in elevated concentrations of hydrocarbons in the exhaust species ranging from about 100 ppm to about 2800 ppm per cylinder in the rich set.

16. The combustion engine of claim 7 wherein the control system is futher configured for sequentially indexing said lean set and said rich set of one or more cylinders.

17. The combustion engine of claim 7 wherein said net-lean combustion exhaust condition comprises an elevated concentration of carbon monoxide ranging from about 0.03 percent to about 1.3 percent per cylinder in the rich set.

18. The combustion engine of claim 7 wherein said net-lean combustion exhaust condition comprises an elevated concentration of hydrocarbons ranging from about 100 ppm to about 2800 ppm per cylinder in the rich set.

* * * * *